A. RIGBY.
POTATO-DIGGER.
No. 178,191. Patented May 30, 1876.
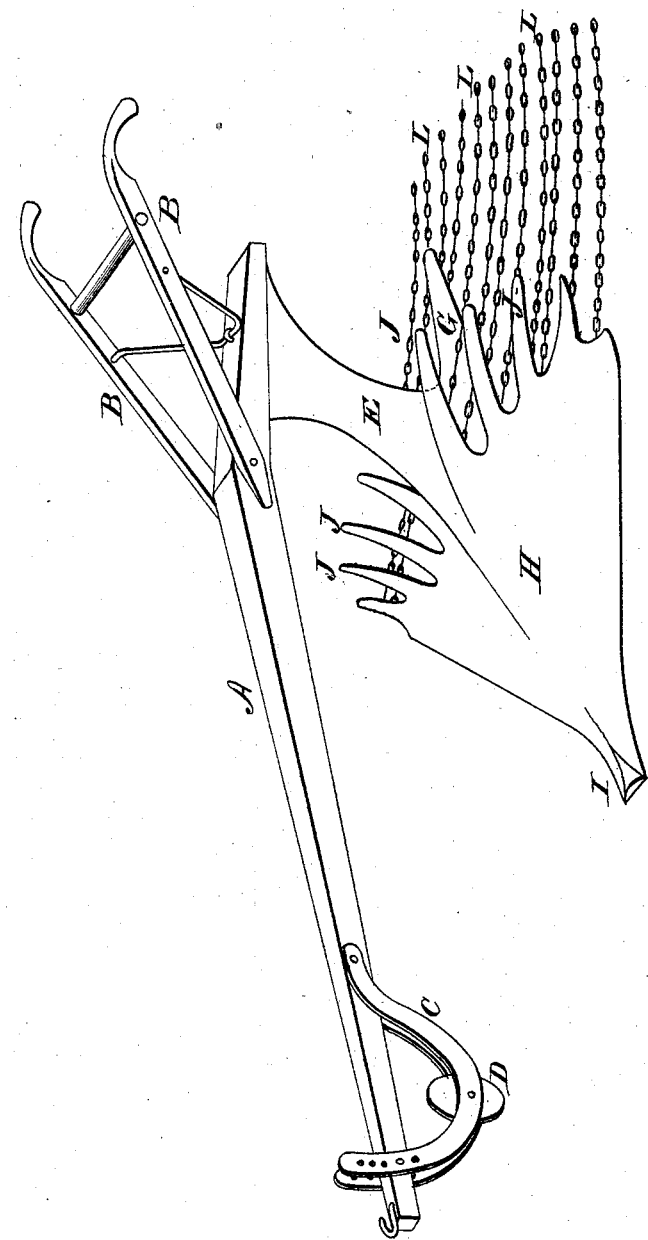

UNITED STATES PATENT OFFICE.

ARTEMAS RIGBY, OF UPPER STILLWATER, MAINE.

IMPROVEMENT IN POTATO-DIGGERS.

Specification forming part of Letters Patent No. 178,191, dated May 30, 1876; application filed April 15, 1876.

*To all whom it may concern:*

Be it known that I, ARTEMAS RIGBY, of Upper Stillwater, in the county of Penobscot and State of Maine, have invented certain new and useful Improvements in Potato-Digger; and I do hereby declare that the following is a full, clear, and exact description thereof, reference being had to the accompanying drawings, and to the letters of reference marked thereon, which form a part of this specification.

The nature of my invention consists in the construction and arrangement of a potato-digger, as will be hereinafter more fully set forth.

In the annexed drawings, the figure represents a perspective view of my invention.

A represents the plow-beam, provided with handles B B, suitably braced thereto. At the front end of the beam A is an adjustable frame, C, carrying the gage-wheel D. E represents the plow-standard, secured near the rear end to the under side of the beam A. This standard has at the bottom a rearwardly-extending bar, G, which runs in the center of the furrow made by the plow. H is the plow, constructed as shown, it being somewhat in the form of a broad shovel, alike on both sides, and with a central projecting point, I. This plow is formed at the upper back edge, on both sides, with outwardly-curved fingers J J, which separate the potatoes from the dirt, and cause them to fall toward both sides, and through between the fingers. A series of chains, L L, are attached to the under surface of the plow at the rear, which chains drag behind on the ground, and clear the potatoes of the adhering dirt, leaving them free and clean on the ground.

This potato-digger is simple, cheap, and durable, and not liable to get out of order.

I am aware that a plow with fingers is not new, and also that loose chains have been used with potato-diggers; hence, I do not claim such as being broadly my invention.

Having thus fully described my invention, what I claim as new, and desire to secure by Letters Patent, is—

The combination, with a plow-beam, A, having adjustable frame C, with gage-wheel D, of the standard E, with rearwardly-extending bar G, plow H, with fingers J, and the chains L, all substantially as and for the purposes herein set forth.

In testimony that I claim the foregoing as my own I affix my signature in presence of two witnesses.

ARTEMAS RIGBY.

Witnesses:
FRANK HAMBLEN,
JAMES MURAY.